United States Patent
Sweeney (10) Patent No.: US 8,819,641 B1
(45) Date of Patent: Aug. 26, 2014

(54) PROGRAM STATE REVERSING SOFTWARE DEVELOPMENT TOOL

(75) Inventor: Timothy Dean Sweeney, Cary, NC (US)

(73) Assignee: Epic Games, Inc., Cary, NC (US)

( * ) Notice: Subject to any disclaimer, the term of this patent is extended or adjusted under 35 U.S.C. 154(b) by 2309 days.

(21) Appl. No.: 11/411,917

(22) Filed: Apr. 27, 2006

(51) Int. Cl.
*G06F 9/44* (2006.01)

(52) U.S. Cl.
USPC .......................................... 717/128; 717/131

(58) Field of Classification Search
USPC .......................................... 717/128, 131–132
See application file for complete search history.

(56) References Cited

U.S. PATENT DOCUMENTS

| | | | |
|---|---|---|---|
| 5,175,856 A | 12/1992 | Van Dyke et al. | |
| 5,210,859 A * | 5/1993 | Aoshima et al. | 714/46 |
| 5,375,125 A * | 12/1994 | Oshima et al. | 714/38 |
| 5,675,803 A | 10/1997 | Preisler et al. | |
| 5,771,385 A | 6/1998 | Harper | |
| 5,812,850 A | 9/1998 | Wimble | |
| 5,870,607 A * | 2/1999 | Netzer | 717/127 |
| 5,956,512 A | 9/1999 | Simmons et al. | |
| 6,026,235 A | 2/2000 | Shaughnessy | |
| 6,101,524 A * | 8/2000 | Choi et al. | 718/102 |
| 6,854,108 B1 * | 2/2005 | Choi | 717/125 |
| 6,981,243 B1 * | 12/2005 | Browning et al. | 717/124 |
| 7,000,151 B2 | 2/2006 | Dwyer | |
| 7,383,538 B2 * | 6/2008 | Bates et al. | 717/128 |
| 2003/0028860 A1 | 2/2003 | Sumida et al. | |
| 2003/0159132 A1 | 8/2003 | Barnett et al. | |
| 2004/0230954 A1 | 11/2004 | Dandoy | |
| 2005/0044532 A1 | 2/2005 | Pfander et al. | |
| 2005/0125788 A1 | 6/2005 | Lupini et al. | |
| 2005/0160404 A1 | 7/2005 | Nachmanson et al. | |
| 2005/0223363 A1 | 10/2005 | Black-Ziegelbein et al. | |
| 2006/0041866 A1 | 2/2006 | Sivaram | |
| 2006/0070041 A1 | 3/2006 | Brumme et al. | |

OTHER PUBLICATIONS

Ye et al. (Fault tolerant model for a functional language parallel machine Show full item record, Proceedings of the 1994 IEEE Region 10's 9th Annual International Conference, p. 632-636).*
Tremblay (Lenient evaluation is neither strict nor lazy, Computer Languages, issue 26, 2000, p. 43-66).*
Alpern et al. (DejaVu: Deterministic Java Replay Debugger for Jalapeno Java Virtual Machine, Proceedings of the conference on Object-Oriented Programming, Systems, Languages, and Applications (OOPSLA 2000), pp. 165-166, 2000).*
Agrawal et al. (An Execution Backtracking Approach to Program Debugging, IEEE Software, vol. 8, Issue 3, pp. 21-26, 1991).*
Clemencon et al. (Visualization, Execution Control and Replay of Massively Parallel Programs within Annai's Debugging Tool, Proc. High-Performance Computing Symposium, p. 393-404, Jul. 1995).*

* cited by examiner

*Primary Examiner* — Li B Zhen
*Assistant Examiner* — Hang Pan
(74) *Attorney, Agent, or Firm* — Hunton & Williams LLP (57) ABSTRACT

A method of analyzing program execution status for use with a computer software debugger that includes identifying one or more non-deterministic execution steps in the program in one or more threads and recording a state of program properties at non-deterministic execution steps to enable determination of prior program execution status.

26 Claims, 9 Drawing Sheets

PROGRAM STATE REVERSING SOFTWARE DEVELOPMENT TOOL

FIELD OF THE INVENTION

Embodiments of the present invention relate to a software development tool that provides analysis of program execution by stopping program execution at a point in time or by replaying a recorded execution of the program from the beginning of application launch.

BACKGROUND OF THE INVENTION

Debuggers can currently start or stop the forward execution of a program at runtime. They can set points in the future execution of the code where a software developer wants the program execution to halt (breakpoints) based upon location in the source code or conditions of the program state (e.g., stop if a local variable contains a particular value). Execution can then be restarted from that point. Debuggers can also have a program execute and analyze execution for each line of source code or execute a portion of the source code without analyzing until a later point in the source code is reached. Frequently, software developers notice the symptoms of a problem with the program they are debugging long after the problem in the code has executed. At this point, the existing debuggers can only show the current state of the program or continue the execution of the program forward if the error permits.

These and other drawbacks exist with current systems.

SUMMARY OF THE INVENTION

One embodiment of the present invention provides a software module for analyzing program execution status for use with a computer software debugger that comprises: executable code for identifying one or more non-deterministic execution steps in the program, and executable code for recording the state of program properties at non-deterministic execution steps to enable determination of prior program execution status.

Other embodiments may be considered.

DETAILED DESCRIPTION OF EXEMPLARY EMBODIMENT(S)

Exemplary embodiments of the invention are discussed in detail below. While specific exemplary embodiments are discussed, it should be understood that this is done for illustration purposes only. A person skilled in the relevant art will recognize that other components and configuration can be used without departing from the spirit and scope of the invention.

Currently, most software is prepared in a programming language. The programming language version is often called source code. Another program, called a compiler, translates program source code to program executable code. Runtime software is then typically used to assist in executing the program at "runtime," which refers to the time at which the program executes. A software developer uses a program, called a debugger, in conjunction with the runtime software to monitor program execution, cause the program to execute in increments ("step through the program"), analyze the state of memory at a point in the program execution and use a variety of other features to track down program errors.

Various embodiments discussed herein overcome the problems of existing debuggers so developers need not try to mentally track back up the chain of the program's execution to isolate the root of the problem in the source code or deduce from the current state of the program what conditions would be necessary to recreate the problem, which can be quite challenging. In prior systems, if the developer could not determine the conditions necessary to recreate the problem, the problem was extremely difficult to isolate and fix. The difficulty of fixing such problems in prior systems was compounded by non-deterministic code which may not have produced the same results when executed again even if the program was restarted from a state identical to the state of the execution run in which the error was detected.

Many software programs have complex execution paths, non-deterministic code and other factors that benefit greatly during their development from various embodiments of a debugger that returns a program's execution to a prior state. Some of these embodiments provide a debugger that may step backwards in the program's execution to greatly reduce the difficulty and time in isolating program errors, fixing program errors and testing program errors.

Accordingly, various embodiments of the present invention address failings of prior software by providing one or more of the following elements: a module for use with a software debugger which analyzes program execution status and identifies non-deterministic execution steps, as explained below; a module to record the state of program properties at non-deterministic execution steps; a module for recording the return values and exception results of Input/Output (I/O) operations; a module for recording the current values of mutable storage cells prior to overwriting such cells with new values; and a module for setting program state to a state in program execution either prior to the current execution point or subsequent to the current execution point (e.g., later in the execution chain as determined from a prior execution of the program code).

Some of the terminology used herein may be understood as follows:

Deterministic may be understood to refer to a computation in which given an initial state of a system and given the same input, there will be only one transition which will result in the same, predictable final state. Non-deterministic may be understood to refer to a computation in which given an initial state of a system and given the same input there are multiple execution paths the system may follow and the final state is not predictable. For example, the computation of arithmetic addition "a+1" is deterministic because its value is dependent on the input "a" and not on external factors, while the operation of reading the computer's clock is non-deterministic because it varies according to the time of day.

Mutable storage may be understood as storage in memory such as variables whose internal state may be modified after creation. Conversely, immutable storage may be understood to be storage in memory such as a constant whose internal state may not be modified after creation.

A snapshot as it relates to computer storage is a representation of memory as it existed at a particular point in the past. For example a snapshot could be a direct copy of memory stored in identical binary format, a copy of memory stored in compressed format, a representation of memory stored in a higher level data format such as XML or a snapshot could be stored as a set of changes relative to a previous snapshot (the delta).

Referential transparency may be understood as the property of an expression whose value is not affected by the time of the evaluation of the expression, by substitution of subexpressions with their values in the expression, or any side-effects that may occur elsewhere in the program. For example, a function which gets time or returns a random number would not be referentially transparent. An expression which is referentially transparent will always behave deterministically.

When a function or operation completes, it typically provides the caller with either a return value indicating its status, or an exception result indicating an error condition or other unusual event. For example, an I/O operation that reads a file might either return a block of data read from the file, or an exception result indicating a hardware fault or that that the end of the file has been reached.

Software transactional memory may be understood to be a mechanism for handling concurrency control and controlling access to shared memory. It is an alternative to systems implementing lock based strategies. It is implemented using a series of reads and writes to shared memory that occur logically at the same time. The reads and writes appear as a single, atomic transaction to outside processes which can see no intermediate states.

Eager evaluation may be understood to be the evaluation scheme used by the C, C++, Java and C# programming languages. With eager evaluation, all terms in a program are evaluated in a purely sequential order determined by the order of the program source code. This scheme has the advantage of efficiency: the runtime software can always access every value referenced without checking whether it has been fully evaluated. The disadvantage is such a language cannot correctly evaluate recursive programs that make use of certain values that have not yet been initialized. For example, if the example x=(x[1]+1,7) were translated into C or C++, the resulting program would attempt to read the second value before it has been initialized, resulting in an unpredictable result such as (11,10) or (−9,−10). Java and C# always pre-initialize such fields to zero prior to evaluating their proper value, so the result would always be (1,7).

Translated into C, that code is:
int x[2];
x[0]=x[1]+1;
x[1]=7;

There are also a number of evaluation schemes with expressive power that exceed eager evaluation, including lazy evaluation and lenient evaluation.

Lazy evaluation is the evaluation scheme used by the Haskell programming language. When an expression is evaluated using this scheme, the evaluation system creates a data structure known as a "thunk" that contains both the executable code the compiler has generated for the expression, and a "program environment" containing the contents of local and global variables that may be referenced by the expression. More specifically, the program environment maps every local variable (by name, memory offset, or some other identification scheme) to either a value (representing the value of the variable in the current context) or a thunk (containing a sub-computation capable of generating the value of that variable on-demand). A thunk may normalized, which is generally understood to be the process of executing the code and updating the thunk to contain its resulting value. Lazy evaluation enables thunks to be created and their evaluation deferred until later, so that their value can be determined on-demand. For example, in evaluating x=(x[1]+1,7), first, a pair of thunks (A,B) is created (the thunk A containing the expression x[1]+1 and the thunk B containing the expression 7, and both associating the variable x recursively to the array value (A,B) which recursively references both thunks). Normalizing those thunks would be done by first reviewing thunk A, containing the expression x[1]+1. Because x[1] refers to the to thunk B (containing the expression 7), thunk B would be normalized first, resulting in the value 7. Thunk A would then be evaluated as 7+1=8. Thus this expression may be safely evaluated out-of-order, resulting in the expected value of (8,7).

Figure 9:
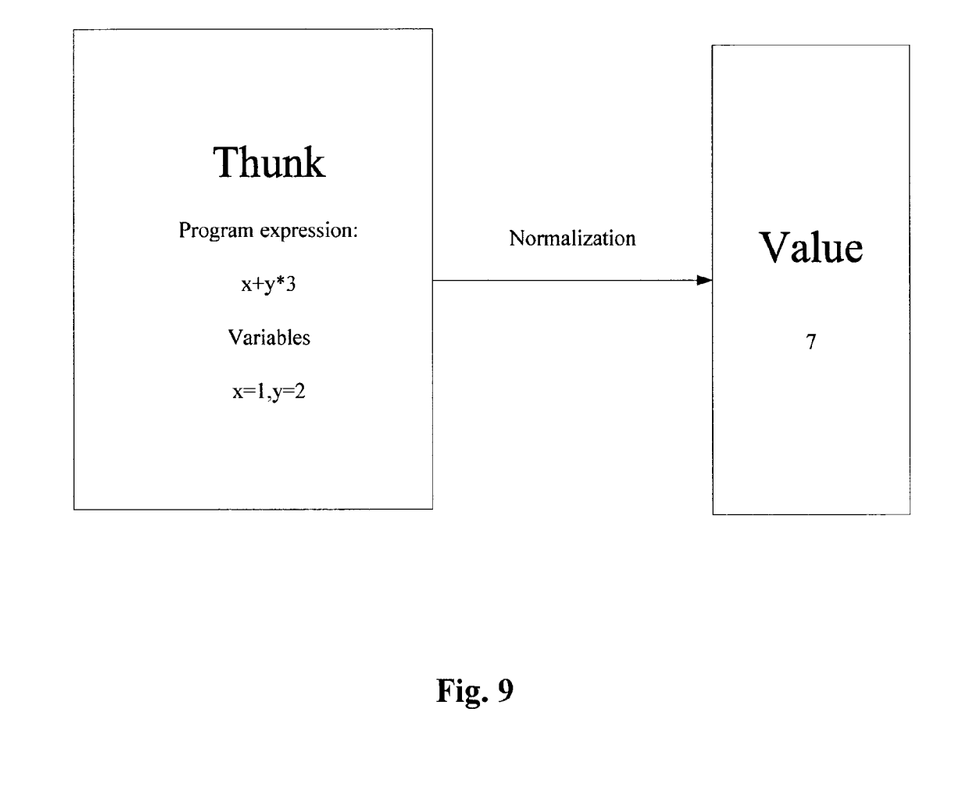
FIG. 9 depicts a schematic of a thunk being normalized into a value according to an embodiment of the present invention.

For clarity, FIG. 9 depicts a schematic showing a thunk being normalized into a value. In this example, the thunk is defined by an expression "x+y*3" and is provided with inputs x=1 and y=2. The value, when normalized, would be 7.

Lenient evaluation is a hybrid scheme with expressive power in between eager evaluation and lazy evaluation. In the lazy evaluation scheme, it is possible for a thunk to be abandoned without ever being normalized, provided any executed portion of the program does not use its value. With lenient evaluation, the runtime software assures that every thunk is always normalized eventually (possibly out-of-order), while still preserving the ability to perform out-of-order evaluation.

Lenient evaluation and lazy evaluation differ in one observable way: divergence. A subexpression of a program is said to diverge if its evaluation never completes—for example if it goes off into an infinite loop, or crashes the runtime software. Otherwise, it is said to converge. In a lenient evaluator, every thunk encountered that represents a divergent computation is guaranteed to cause program execution to diverge. In a lazy evaluator, thunks are only normalized when their value is required by another expression—which might never occur. Thus using lazy evaluation, a convergent program may contain divergent thunks, provided that their value is not required in any computation affecting the final program result.

Figure 1:
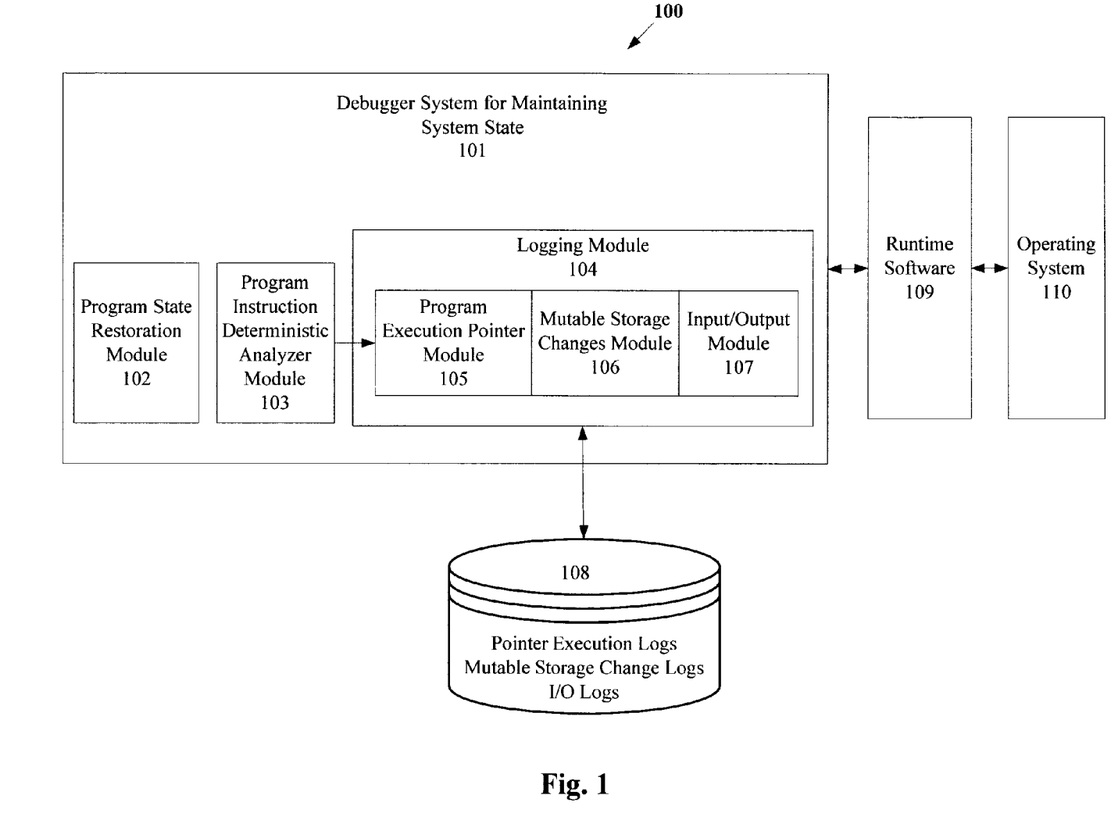
FIG. 1 depicts an exemplary system for analyzing and recording program state during the execution of a program according to an embodiment of the present invention.

FIG. 1 depicts a debugger system according to one embodiment of the present invention. System 100 may comprise one or more of the following modules: program state restoration module 102, program instruction deterministic analyzer module 103, program execution pointer logging module 105, mutable storage logging module 106, I/O logging module 107, storage for logging 108, runtime software 109 and operating system 110.

Program state restoration module 102 may enable the restoration of program state to an earlier program execution point or an execution point subsequent to the current execution point. In some embodiments this may include resetting the program execution pointer to correspond to the earlier execution point and restoring values of mutable storage to the values corresponding to the execution point. In some embodiments a revision control system may enable the restoration of the program state.

Program instruction deterministic analyzer module 103 determines for each executing thread if an instruction will always produce the same result when executed given the same input (i.e., deterministically). In some embodiments this may include analyzing program code developed in a language that supports referential transparency enabling the program instruction deterministic analyzer module 103 to establish as deterministic portions of the program code which use language constructs known to be referentially transparent.

Logging module 104 may log some or all program properties so that program state may be subsequently restored. In some embodiments this may include the use of a revision control system for logging program properties. In some embodiments this may include tracking branches of possible program execution to enable a program restored to an earlier execution point to follow an alternative branch of program code during program re-execution.

Program execution pointer module 105 records program execution pointer information at some or all states which are non-deterministic so that the status of the program execution pointer may be determined at points in program execution history.

Mutable storage changes module 106 may record some or all changes to mutable storage so that the status of mutable storage may be determined at points in program execution history. In some embodiments this may include changes to variables or other non-constant memory structures. In some embodiments this may include recording the original state of thunks so that computations within a thunk may be subsequently restored. In some embodiments the recording of mutable storage cells comprises one or more snapshots of the state of mutable storage compressed relative to a known prior state of mutable storage. In some embodiments the recording of mutable storage comprises recording implemented utilizing software transactional memory.

Input/Output module 107 may record some or all return values and exception results of Input/Output operations (I/O) which are performed during the execution of the program so that the return values or exception results of an I/O operation may be determined during subsequent execution of the code without re-submitting the I/O operation to the operating system.

Storage 108 provides for the logging of program execution pointer logs, mutable storage change logs and I/O logs. In some embodiments of the invention this may be traditional data storage such as hard disks or memory storage. In some embodiments of the invention this may be a revision control system. Any other type of storage may also be used.

Runtime software 109 enables the debugger system 101 to execute the code. In some embodiments of the invention this runtime software may be runtime software that invokes a lenient and or a lazy evaluation scheme. In some embodiments the invention the program code may be running in a distributed environment (i.e.—portions of the code may be executing on separate computers communicating by a network).

Figure 2:
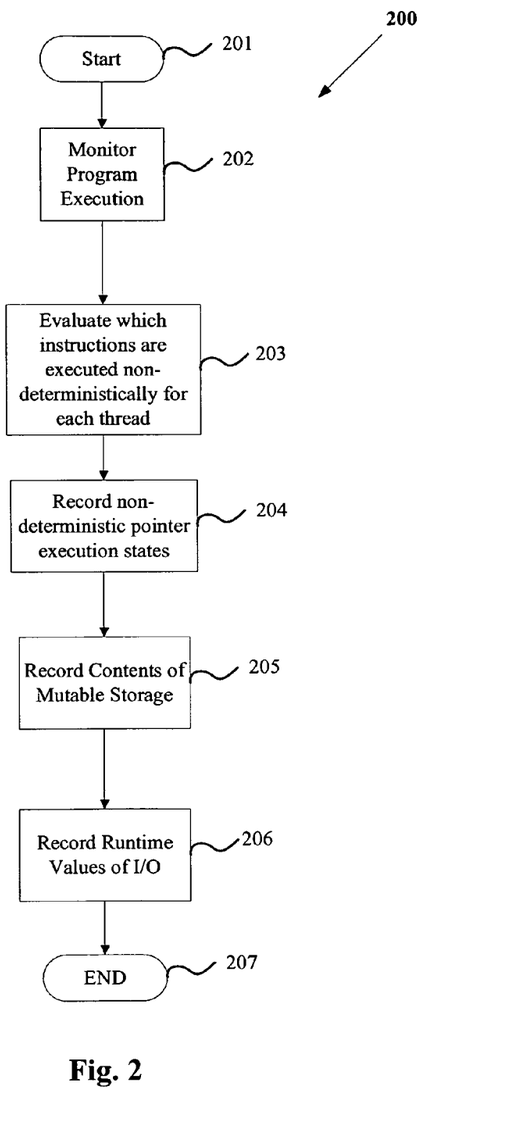
FIG. 2 illustrates a flow chart depicting an exemplary method for recording program state at non-deterministic execution points and recording the return values and exception results of input/output (I/O) operations and state of mutable storage to enable the determination of prior program execution status according to an embodiment of the present invention.

According to an embodiment of the present invention, a methodology 200 may be provided as depicted in FIG. 2. In process 203 program instructions may be evaluated during execution to determine which instructions execute non-deterministically in each thread. In process 204 non-deterministic program execution pointer states are recorded. In process 205 the changes to mutable storage may be recorded. An additional process, process 206 may be implemented to record the return values and exception results of Input/Output Operations (I/O). Using methodology 200 the program status at any point in its execution history may be subsequently determined.

Process 203 may involve determining for each executing thread if an instruction will always produce the same result when executed given the same input (i.e.—deterministically).

Process 204 may involve recording program execution pointer information at states which are non-deterministic so that the status of the program execution pointer may be determined at any point in program execution history.

Process 205 may involve recording changes to mutable storage so that the status of mutable storage may be determined at any point in program execution history. This may include changes to variables or other non-constant memory structures.

Process 206 may involve recording the result values of all Input/Output operations (I/O) which are performed during the execution of the program so that the return value or exception results of any I/O operation may determined during subsequent execution of the code without re-submitting the I/O operation to the operating system.

Figure 3:
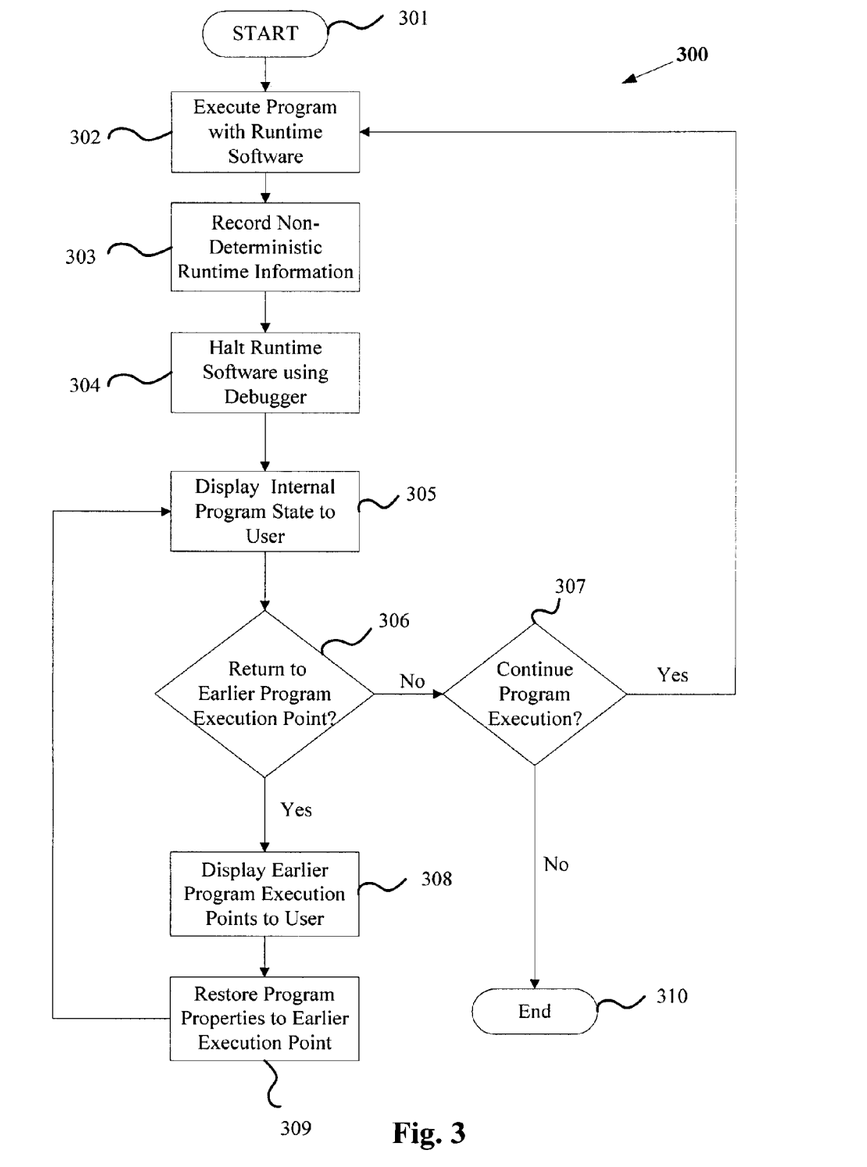
FIG. 3 illustrates a flow chart showing an exemplary method for recording program state at non-deterministic execution points, displaying internal program status to a user, enabling a user to choose from among program execution points and restoring the program state to the specified execution point according to an embodiment of the present invention.

FIG. 3 illustrates a flow chart 300 showing an exemplary method for recording program state properties, displaying internal program status to a user, enabling a user to choose from program execution points and restoring program properties to the state of the execution point specified by the user. According to one or more embodiments flow chart 300 may begin at block 301. At block 302 a debugger may execute program code using runtime software. During the execution of the program code the debugger may record non-deterministic runtime information at block 303. When a user halts the execution of the runtime software using the debugger at block 304, internal program state may be displayed to the user at block 305. If the user chooses at block 306 to return to an earlier program execution point, in block 308 program execution points may be displayed to the user. In block 309 one or more program properties may be restored to those of the specified earlier execution point and it may display the internal state of the program at that execution point. If the user chooses at block 306 not to return to an earlier program execution point, they may choose at block 307 to continue program execution or end execution at block 310.

Figure 4:
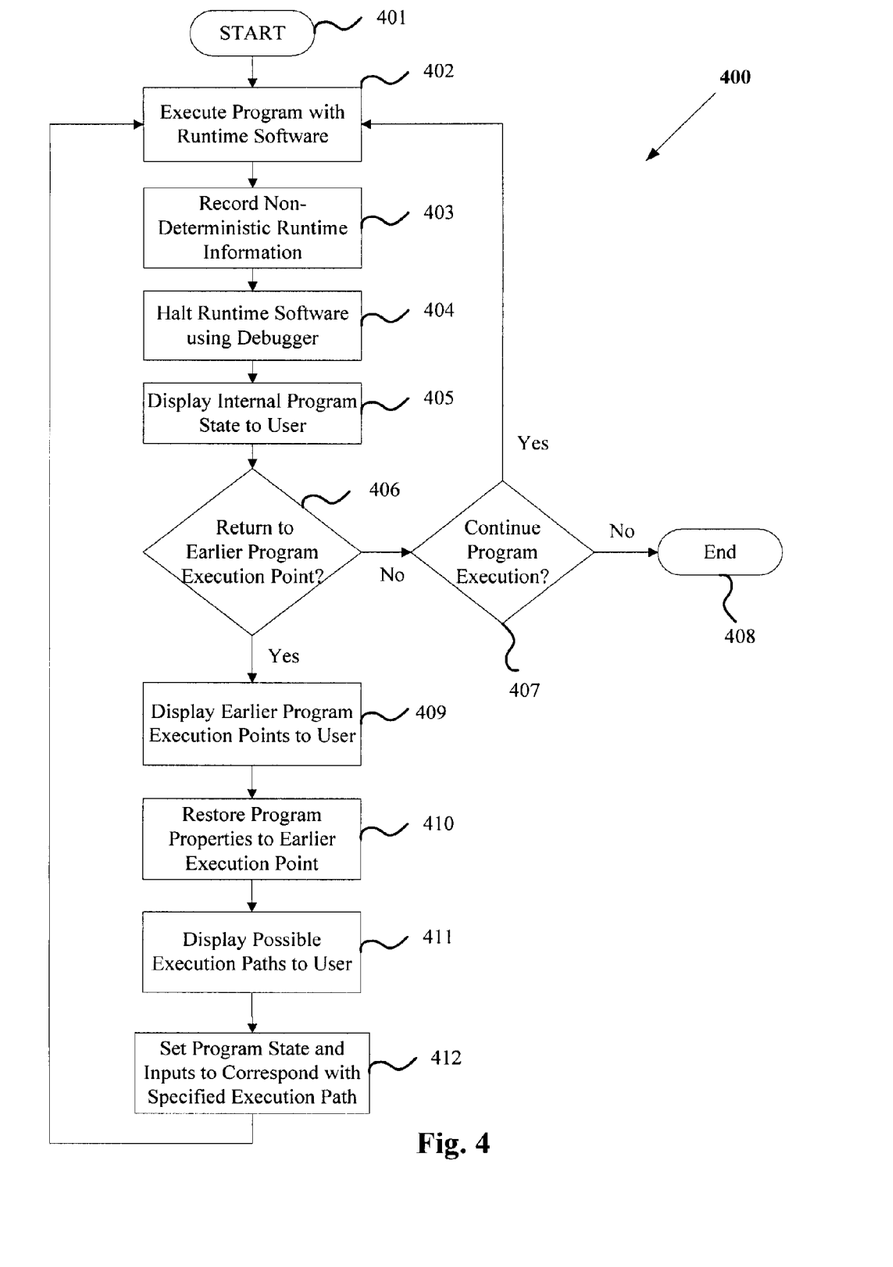
FIG. 4 illustrates a flow chart showing an exemplary method for recording program state at non-deterministic execution points, displaying internal program status to a user, enabling a user to choose from among program execution points, restoring the program state to the specified execution point, enabling the user to choose from displayed possible execution paths and setting the program state and inputs to correspond with the specified execution path according to an embodiment of the present invention.

FIG. 4 illustrates a flow chart 400 showing an exemplary method for recording program state properties, displaying internal program status to a user, enabling a user to choose from program execution points, restoring program properties to the state of the execution point specified by the user, displaying possible execution paths to the user and setting program state and inputs to correspond with the specified execution state. According to one or more embodiments flow chart 400 may begin at block 401. At block 402 a debugger may execute program code using runtime software. During the execution of the program code the debugger records non-deterministic runtime information at block 403. When a user halts the execution of the runtime software using the debugger at block 404, internal program state may be displayed to the user at block 405. If the user chooses at block 406 to return to an earlier program execution point, block 409 may display program execution points to the user. Block 410 may restore the program properties to those of the specified earlier execution point. Possible execution paths for program code to follow upon re-execution may be displayed to the user at block 411. The program state and inputs are set to correspond with the specified execution path and the program may be executed using the runtime software at block 402. If the user chooses at block 406 not to return to an earlier program execution point, they may choose at block 407 to continue program execution or end execution at block 410.

Figure 5:
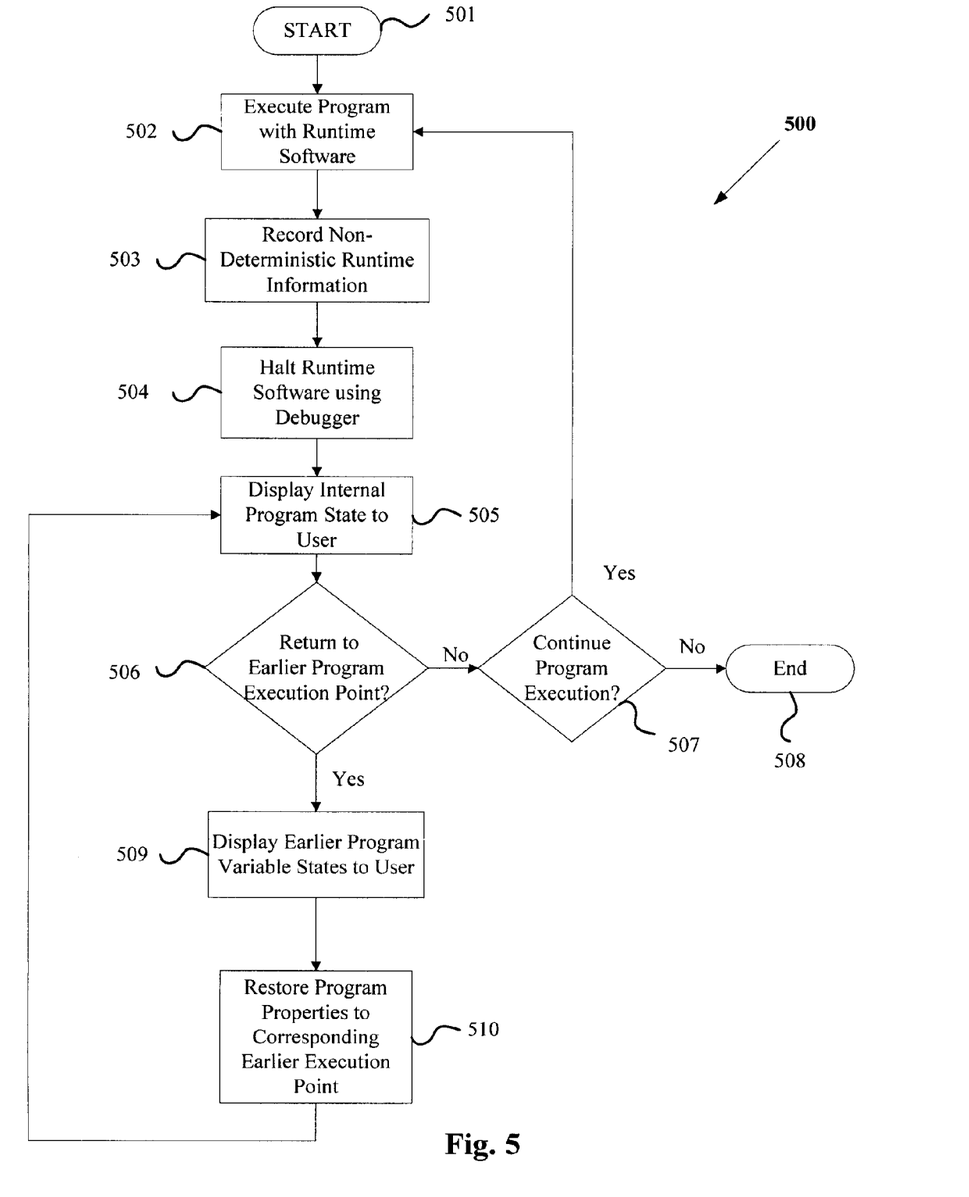
FIG. 5 illustrates a flow chart showing an exemplary method for recording program state at non-deterministic execution points, displaying internal program status to a user, enabling a user to choose from tracked program variables, displaying changes to the program variable to the user, enabling the user to choose from the display a specific state of the variable and restoring the program state to the point at which the program variable is in the specified state according to an embodiment of the present invention.

FIG. 5 illustrates a flow chart 500 showing an exemplary method for recording program state properties, displaying internal program status to a user, enabling a user to choose from program variable states for a specified variable and restoring program properties to the execution point corresponding to the specified program variable state. According to one or more embodiments flow chart 500 may begin at block 501. At block 502 a debugger may execute program code using runtime software. During the execution of the program code the debugger may record non-deterministic runtime information at block 503. When a user halts the execution of the runtime software using the debugger at block 504, internal program state may be displayed to the user at block 505. If the user chooses at block 506 to return to an earlier program execution point, in block 509 earlier program variable states may be displayed to the user. Block 510 may restore the program properties to those of the specified earlier execution point and the internal state of the program at that execution point may be displayed at block 505. If the user chooses at block 506 not to return to an earlier program execution point, they may choose at block 507 to continue program execution or end execution at block 508.

Figure 6:
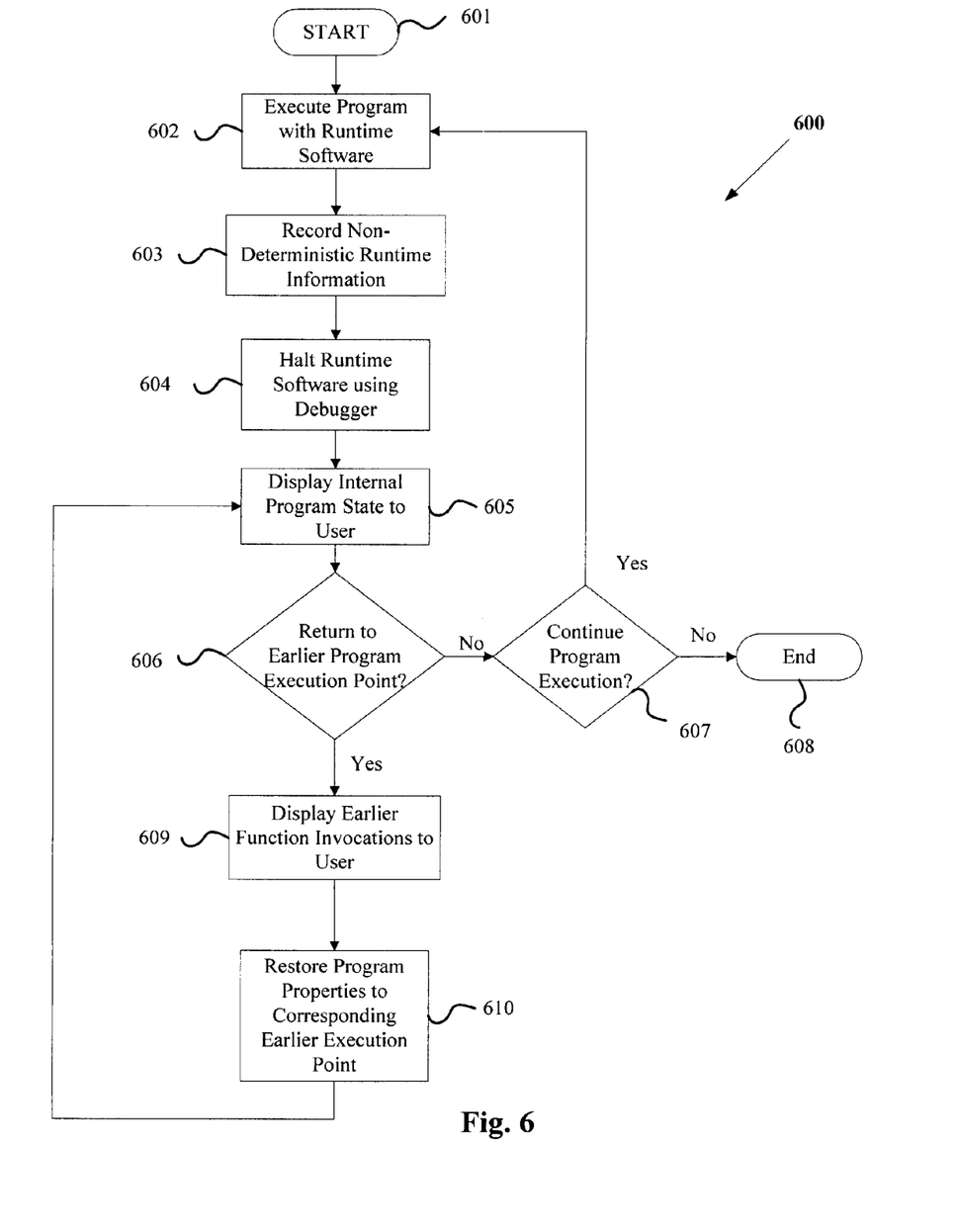
FIG. 6 illustrates a flow chart showing an exemplary method for recording program state at non-deterministic execution points, displaying internal program status to a user, enabling a user to choose from tracked function invocations, displaying function invocations to the user, enabling the user to choose from the display a specific function invocation and restoring the program state to the point at which the function was invoked according to an embodiment of the present invention.

FIG. 6 illustrates a flow chart 600 showing an exemplary method for recording program state properties, displaying internal program status to a user, enabling a user to choose from earlier function invocations for a specified function and restoring program properties to the execution point corresponding to the specified function invocation. According to one or more embodiments flow chart 600 may begin at block 601. At block 602 a debugger may execute program code using runtime software. During the execution of the program code the debugger may record non-deterministic runtime information at block 603. When a user halts the execution of the runtime software using the debugger at block 604, internal program state may be displayed to the user at block 605. If the user chooses at block 606 to return to an earlier program execution point, in block 609 earlier function invocations may be displayed to the user. Block 610 may restore the program properties to those of the corresponding earlier execution point and the internal state of the program at that execution point may be displayed at block 605. If the user chooses at block 606 not to return to an earlier program execution point, they may choose at block 607 to continue program execution or end execution at block 608.

Figure 7:
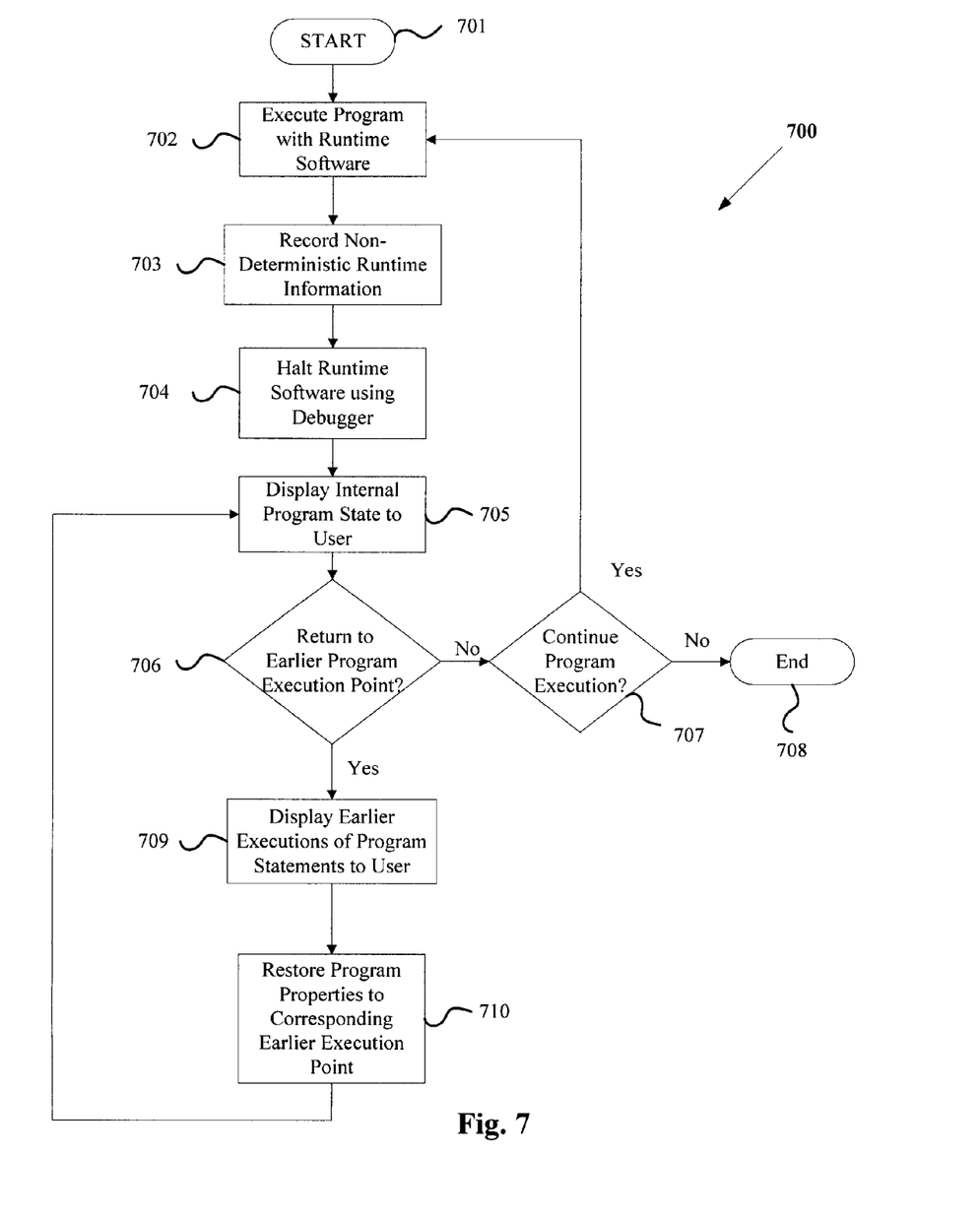
FIG. 7 illustrates a flow chart showing an exemplary method for recording program state at non-deterministic execution points, displaying internal program status to a user, enabling a user to choose from tracked program statements, displaying executions of a program statement to the user, enabling the user to choose from the display a specific execution of the program statement and restoring the program state to the point of the specified program statement according to an embodiment of the present invention.

FIG. 7 illustrates a flow chart 700 showing an exemplary method for recording program state properties, displaying internal program status to a user, enabling a user to choose from executions of a program statement for a specified program statement and restoring program properties to the corresponding execution point. According to one or more embodiments flow chart 700 may begin at block 701. At block 702 a debugger may execute program code using runtime software. During the execution of the program code the debugger may record non-deterministic runtime information at block 703. When a user halts the execution of the runtime software using the debugger at block 704, internal program state may be displayed to the user at block 705. If the user chooses at block 706 to return to an earlier program execution point, in block 709 earlier executions of a program statement may be displayed to the user. Block 710 may restore the program properties to the corresponding earlier execution point and the internal state of the program at that execution point may be displayed at block 705. If the user chooses at block 706 not to return to an earlier program execution point, they may choose at block 707 to continue program execution or end execution at block 708.

Figure 8:
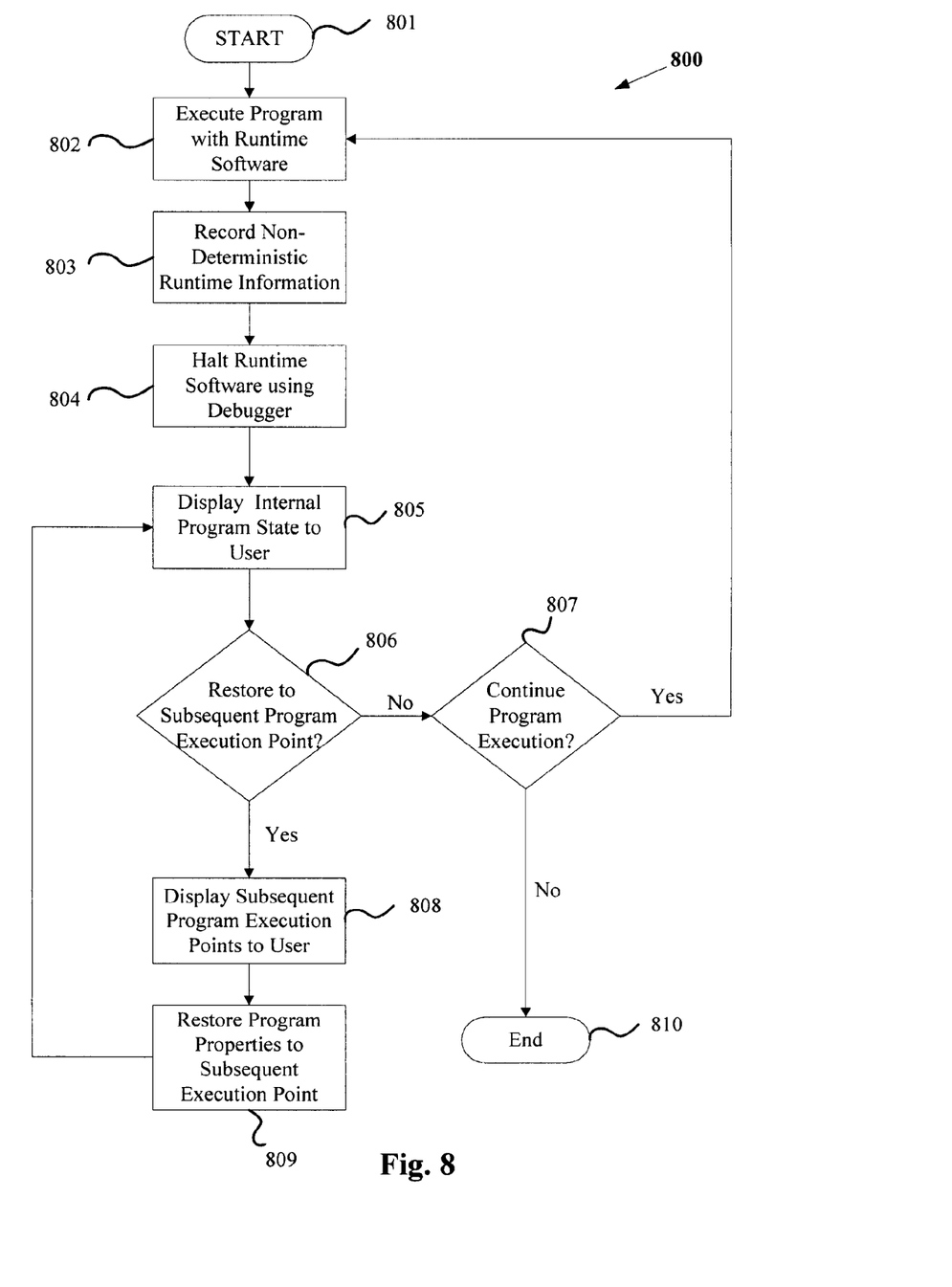
FIG. 8 illustrates a flow chart showing an exemplary method for recording program state at non-deterministic execution points, displaying internal program status to a user, enabling a user to choose from among program execution points subsequent to the current execution point and restoring the program state to the specified execution point according to an embodiment of the present invention.

FIG. 8 illustrates a flow chart 800 showing an exemplary method for recording program state properties, displaying internal program status to a user, enabling a user to choose from program execution points subsequent to the current point of execution and restoring program properties to the state of the execution point specified by the user. According to one or more embodiments flow chart 800 may begin at block 801. At block 802 a debugger may execute program code using runtime software. During the execution of the program code the debugger may record non-deterministic runtime information at block 803. When a user halts the execution of the runtime software using the debugger at block 804, internal program state may be displayed to the user at block 805. If the user chooses at block 806 to return to a program execution point subsequent to the current execution point, in block 808 program execution points may be displayed to the user. Execution points subsequent to the current execution point may be available from prior executions of the program code. In block 809 one or more program properties may be restored to those of the specified earlier execution point and it may display the internal state of the program at that execution point. If the user chooses at block 806 not to return to a subsequent program execution point, they may choose at block 807 to continue program execution or end execution at block 810.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of analyzing program execution status for use with a computer software debugger comprising:
identifying, using at least one computer processor, one or more non-deterministic execution steps in a program in one or more threads, wherein the one or more non-deterministic execution steps comprise computations in which given an initial state of a system and given a same input there are multiple execution paths the system is capable of following and a final state is not predictable wherein the one or more non-deterministic execution steps are performed by a debugger which minimizes recording necessary for deterministic re-execution of program code developed in a language supporting referential transparency, wherein the debugger identifies one or more portions of the program code which are deterministic by ensuring that the one or more identified portions of the program code uses language constructs known to be referentially transparent;
recording a state of program properties at the identified one or more non-deterministic execution steps to enable determination of prior program execution status;
recording one or more return values or exception results of one or many I/O operations; and
resetting a program state to a prior state wherein subsequent re-execution of program code does not submit I/O operations to an operating system and returns values and exception results corresponding to the I/O operations from the recording maintaining behavior and appearance during re-execution of the code consistent with the actual I/O operation during initial execution.

2. The method of claim 1 further comprising:
displaying execution status of the prior state to a user.

3. The method of claim 1 further comprising:
restoring one or more program properties to enable program re-execution from the prior state wherein the program execution follows an execution path and program branches identical to a previous execution, and the one or more program properties are maintained at each execution step consistent with the previous execution.

4. The method of claim 3 wherein the prior state of program execution is restored from a previous execution of the program and is subsequent to a current point of program execution.

5. The method of claim 1 further comprising:
wherein the prior state is an initial state in a program's execution;
restoring one or more program properties to enable program re-execution from the initial state wherein the program execution follows a execution path and program branches identical to a previous execution, and the one or more program properties are maintained at each execution step consistent with the previous execution.

6. The method of claim 3 further comprising receiving a selection from a user specifying the prior state in program execution history.

7. The method of claim 6 wherein the prior state in program execution history further comprises a program execution pointer.

8. The method of claim 6 wherein the prior state in program execution history further comprises a call stack.

9. The method of claim 6 wherein the prior state in program execution history further comprises one or more values of local variables.

10. The method of claim 1 further comprising:
recording a current value of a mutable storage cell prior to the current value changing, wherein the recorded value is later be restored.

11. The method of claim 10 wherein the recording of mutable storage uses software transactional memory.

12. The method of claim 10 wherein the recording of mutable storage cells is a snapshot which is compressed relative to a known prior state of mutable storage.

13. The method of claim 1 further comprising:
providing runtime software which invokes a lenient evaluation scheme; and
recording an original state of one or more thunks prior to the one or more thunks being updated with a value to enable subsequent re-execution of computations within the one or more thunks.

14. The method of claim 1,
wherein the debugger allows a user to set breakpoints to be monitored during re-execution of the code.

15. The method of claim 3,
wherein the debugger allows a user to set memory watches to be monitored during re-execution of the code.

16. The method of claim 3 wherein:
execution of program code occurs across two or more computers; and
wherein re-execution of the program code supports distributed computing.

17. The method of claim 3 further comprising:
providing a revision control system that records program state, restores program state and tracks program state.

18. The method of claim 3 further comprising:
wherein the debugger tracks one or many branches of possible program execution;
enabling a user to stop program execution at a particular point;
enabling a user to restore program state to an earlier execution point, re-execute program code the program code performing new I/O operations; and
re-executing the program code following a different execution path from the earlier execution point.

19. The method of claim 18 further comprising:
wherein the debugger further enables a user to choose from one or many execution paths and enables re-execution of program code wherein program execution will follow a specified execution path.

20. The method of claim 3 further comprising:
wherein the debugger tracks changes to a program variable prior to a position of program execution and subsequent to the position of program execution; and displaying to the user a list of changes to the program variable.

21. The method of claim 20 wherein the list of changes to the program variable is sorted chronologically.

22. The method of claim 20 further comprising:
wherein the debugger further enables a user to choose from the list of changes to the program variable a specific state of the variable; and
restoring program state to the point at which the program variable is in the specified state.

23. The method of claim 3 further comprising:
tracking invocations of functions from previous executions of the program code and the current execution of the program code; and
wherein the debugger enables a user to specify a function wherein the debugger lists invocations of the function and the debugger displays the current point of program execution relative to the list of function invocations; and
wherein the debugger further enables the user to choose a particular prior or subsequent invocation of the function from the list and restores the program state to the point in time of that function invocation.

24. The method of claim 3 further comprising:
tracking executions of individual program statements from previous executions of the program code and the current execution of the program code; and
wherein the debugger enables a user to specify a particular program statement and the debugger lists executions of the program statement and the debugger displays the current point of program execution relative to the list of program statement executions; and
wherein the debugger further allows the user to choose a particular prior or subsequent execution of the program statement from the list and restores the program state to the point in time of that program statement execution.

25. A system for analyzing program execution status for use with a computer software debugger comprising:
a program instruction deterministic analyzer module stored in a non-transitory storage medium which identifies one or more non-deterministic execution steps in a program in one or more threads, wherein the one or more non-deterministic execution steps comprise computations in which given an initial state of a system and given a same input there are multiple execution paths the system is capable of following and a final state is not predictable wherein the one or more non-deterministic execution steps are performed by a debugger which minimizes recording necessary for deterministic re-execution of program code developed in a language supporting referential transparency, wherein the debugger identifies one or more portions of the program code which are deterministic by ensuring that the one or more identified portions of the program code uses language constructs known to be referentially transparent;
a logging module which records a state of program properties at non-deterministic execution steps to enable determination of prior program execution status;
a recording module which records one or more return values or exception results of one or many I/O operations; and
a module for setting a program state to a prior state wherein subsequent re-execution of program code does not submit I/O operations to an operating system and returns values and exception results corresponding to the I/O operations from the recording maintaining behavior and appearance during re-execution of the code consistent with the actual I/O operation during initial execution.

26. A non-transitory processor readable storage medium for storing a computer program of instructions configured to be readable by at least one processor for instructing the at least one processor to execute a computer process for analyzing program execution status for use with a computer software debugger, the non-transitory processor readable storage medium comprising:
instructions stored on a storage medium;
wherein the instructions are configured to be readable from the storage medium by at least one processor and thereby cause the at least one processor to operate so as to:
identify one or more non-deterministic execution steps in a program in one or more threads, wherein the one or more non-deterministic execution steps comprise computations in which given an initial state of a system and given a same input there are multiple execution paths the system is capable of following and a final state is not predictable wherein the one or more non-deterministic execution steps are performed by a debugger which minimizes recording necessary for deterministic re-execution of program code developed in a language supporting referential transparency, wherein the debugger identifies one or more portions of the program code which are deterministic by ensuring that the one or more identified portions of the program code use language constructs known to be referentially transparent;
record a state of program properties at non-deterministic execution steps to enable determination of prior program execution status;
record one or more return values or exception results of one or many I/O operations; and
reset a program state to a prior state wherein subsequent re-execution of program code does not submit I/O operations to an operating system and returns values and exception results corresponding to the I/O operations from the recording maintaining behavior and appearance during re-execution of the code consistent with the actual I/O operation during initial execution.

* * * * *